United States Patent
Agarwal et al.

(10) Patent No.: US 12,541,455 B2
(45) Date of Patent: Feb. 3, 2026

(54) DATA STORAGE DEVICE AND METHOD FOR DEFINING CACHING LAYERS BASED ON CACHE ATTRIBUTES

(71) Applicant: Sandisk Technologies, Inc., Milpitas, CA (US)

(72) Inventors: Dinesh Kumar Agarwal, Bangalore (IN); Amit Sharma, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 39 days.

(21) Appl. No.: 18/736,948

(22) Filed: Jun. 7, 2024

(65) Prior Publication Data

US 2025/0378029 A1    Dec. 11, 2025

(51) Int. Cl.
*G06F 12/0811*    (2016.01)

(52) U.S. Cl.
CPC ................................ *G06F 12/0811* (2013.01)

(58) Field of Classification Search
CPC ... G06F 12/0811; G06F 12/128; G06F 3/0688
See application file for complete search history.

(56) References Cited

U.S. PATENT DOCUMENTS

| | | | | |
|---|---|---|---|---|
| 7,434,002 B1* | 10/2008 | Zedlewski | .......... | G06F 11/3409 712/216 |
| 7,581,064 B1* | 8/2009 | Zedlewski | ............ | G06F 12/084 711/119 |
| 7,802,057 B2* | 9/2010 | Iyer | ........................ | G06F 9/5016 718/103 |
| 8,595,439 B1* | 11/2013 | Koh | .......................... | G06F 8/30 711/123 |
| 9,405,476 B1* | 8/2016 | Joshi | .................... | G06F 12/0866 |
| 9,483,404 B2* | 11/2016 | Atkisson | .............. | G06F 12/0833 |
| 10,073,656 B2* | 9/2018 | Zhe Yang | .............. | G06F 3/0665 |
| 10,642,737 B2* | 5/2020 | Mola | .................... | G06F 12/0808 |
| 11,138,121 B2* | 10/2021 | Hagersten | ............ | G06F 12/0846 |
| 12,067,268 B2* | 8/2024 | Vishne | ................... | G06F 3/0653 |
| 2002/0053006 A1* | 5/2002 | Kawamoto | ............ | G06F 12/128 711/E12.07 |
| 2008/0104150 A1* | 5/2008 | Moore | ................... | G06F 3/0608 |
| 2009/0070527 A1* | 3/2009 | Tetrick | ................ | G06F 12/0888 711/E12.019 |

(Continued)

OTHER PUBLICATIONS

Bruce Jacob, Spencer W. Ng, David T. Wang, Chapter 15—Memory System Design Analysis, Editor(s): Bruce Jacob, Spencer W. Ng, David T. Wang, Memory Systems, Morgan Kaufmann, 2008, pp. 541-597, ISBN 9780123797513, https://doi.org/10.1016/B978-012379751-3.50017-5. (Year: 2008).*

*Primary Examiner* — Ramon A. Mercado
(74) *Attorney, Agent, or Firm* — Crowell & Moring LLP

(57) ABSTRACT

A data storage device and method are disclosed for defining caching layers based on cache attributes. In one embodiment, a data storage device is provided comprising a non-volatile memory, a plurality of caches, and one or more processors. The one or more processors, individually or in combination, are configured to: receive a command from a host to read data from the non-volatile memory; select a cache from the plurality of caches based on at least one cache attribute other than speed; read the data from the non-volatile memory; and store the data in the selected cache. Other embodiments are provided.

15 Claims, 15 Drawing Sheets

(56) References Cited

U.S. PATENT DOCUMENTS

| | | | | |
|---|---|---|---|---|
| 2011/0022801 A1* | 1/2011 | Flynn | ............... | H04L 12/403 |
| | | | | 711/120 |
| 2012/0210066 A1* | 8/2012 | Joshi | ............... | G06F 12/0888 |
| | | | | 711/E12.017 |
| 2015/0113223 A1* | 4/2015 | Brown | ............ | G06F 12/0893 |
| | | | | 711/133 |
| 2016/0147666 A1* | 5/2016 | Li | ................. | G06F 12/0897 |
| | | | | 711/122 |
| 2017/0242623 A1* | 8/2017 | Jung | ............. | G06F 12/0866 |
| 2021/0112135 A1* | 4/2021 | Mahdian | ............ | H04L 67/10 |
| 2021/0157739 A1* | 5/2021 | Gholkar | ............ | G06F 12/126 |
| 2023/0400994 A1* | 12/2023 | Vishne | ............. | G06F 3/0659 |
| 2023/0409489 A1* | 12/2023 | Tran | ............ | G06F 9/3836 |
| 2023/0409589 A1* | 12/2023 | Field | ............ | G06F 16/86 |
| 2024/0095177 A1* | 3/2024 | Chen | ............. | G06F 12/0864 |

\* cited by examiner

DATA STORAGE DEVICE AND METHOD FOR DEFINING CACHING LAYERS BASED ON CACHE ATTRIBUTES

BACKGROUND

A plurality of caches can be maintained in a data storage device to accelerate various commands, such as read commands to a non-volatile memory in the data storage device. Cache utilization can be based on cache size or cache speed. A relatively-faster cache is typically preferred over a relatively-slower cache.

DETAILED DESCRIPTION

Figure 1A:
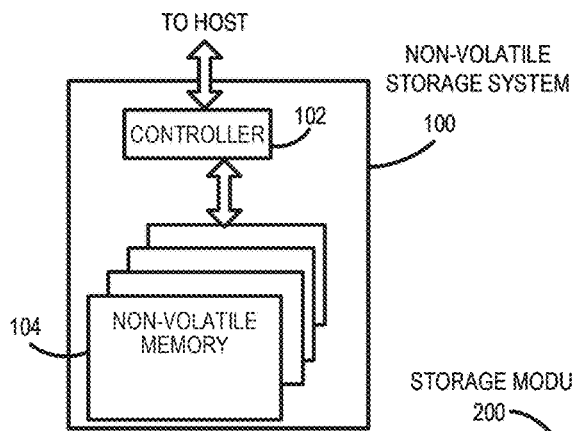
FIG. 1A is a block diagram of a data storage device of an embodiment.

The following embodiments generally relate to a data storage device and method for defining caching layers based on cache attributes. In one embodiment, a data storage device is provided comprising a non-volatile memory, a plurality of caches, and one or more processors. The one or more processors, individually or in combination, are configured to: receive a command from a host to read data from the non-volatile memory; select a cache from the plurality of caches based on at least one cache attribute other than speed; read the data from the non-volatile memory; and store the data in the selected cache.

In some embodiments, the at least one cache attribute comprises cache release time.

In some embodiments, the at least one cache attribute comprises cache arrival time.

In some embodiments, the at least one cache attribute comprises cache release rate.

In some embodiments, the at least one cache attribute comprises cache arbitration policy.

In some embodiments, the at least one cache attribute comprises cache eviction ratio.

In some embodiments, the plurality of caches comprises four caches.

In some embodiments, the plurality of caches comprises a static random-access memory.

In some embodiments, the plurality of caches comprises a dynamic random-access memory.

In some embodiments, the plurality of caches comprises a data latch in the non-volatile memory.

In some embodiments, the one or more processors, individually or in combination, are further configured to expose the at least one cache attribute to the host.

In some embodiments, the one or more processors, individually or in combination, are further configured to select the selected cache based on estimated fetch time for the read command.

In some embodiments, the non-volatile memory comprises a three-dimensional memory.

In another embodiment, a method is provided that is performed in a data storage device comprising a non-volatile memory. The method comprises: dynamically defining a cache layer priority; receiving a command from a host; and using the cache layer priority and at least one parameter associated with a plurality of caches to select a cache from the plurality of caches to use for the command.

In some embodiments, the at least one parameter comprises one or more of: cache release time, cache arrival time, cache release rate, cache arbitration policy, and cache eviction ratio.

In some embodiments, the plurality of caches comprises a host memory buffer, a static random-access memory, a dynamic random-access memory, and a data latch in the non-volatile memory.

In some embodiments, the method further comprises: exposing the at least one parameter to the host.

In some embodiments, the cache is selected based on estimated fetch time.

In some embodiments, the non-volatile memory comprises a three-dimensional memory.

In another embodiment, a data storage device is provided comprising: a non-volatile memory; a plurality of caches; and means for storing data in a cache of the plurality of caches that is selected based on a cache layer priority system that is dynamically-defining based on at least one cache parameter.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
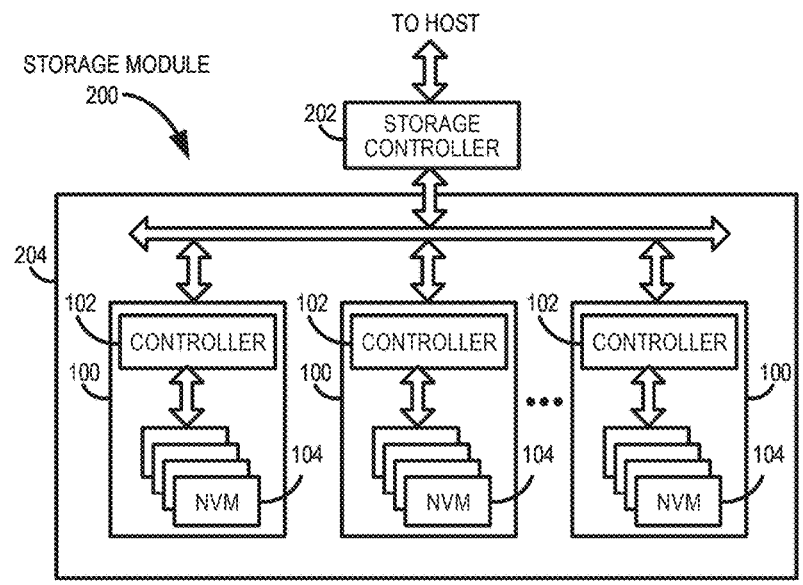
FIG. 1B is a block diagram illustrating a storage module of an embodiment.
Figure 1C:
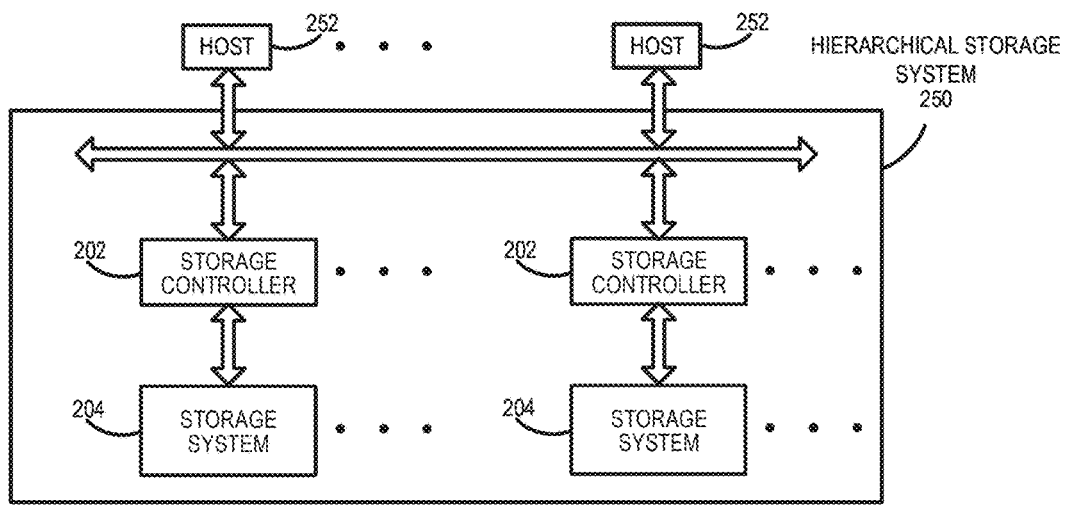
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG.

1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
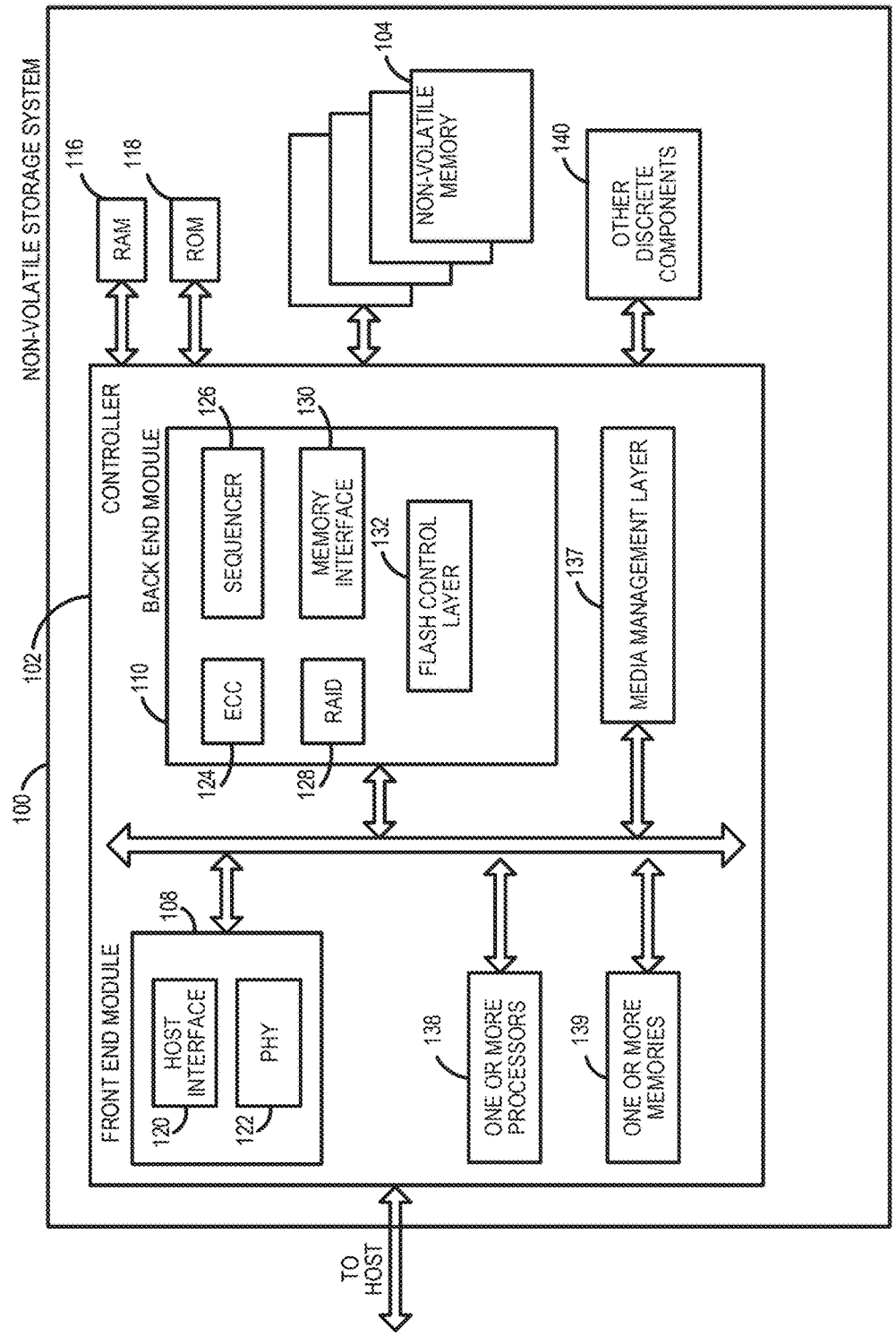
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
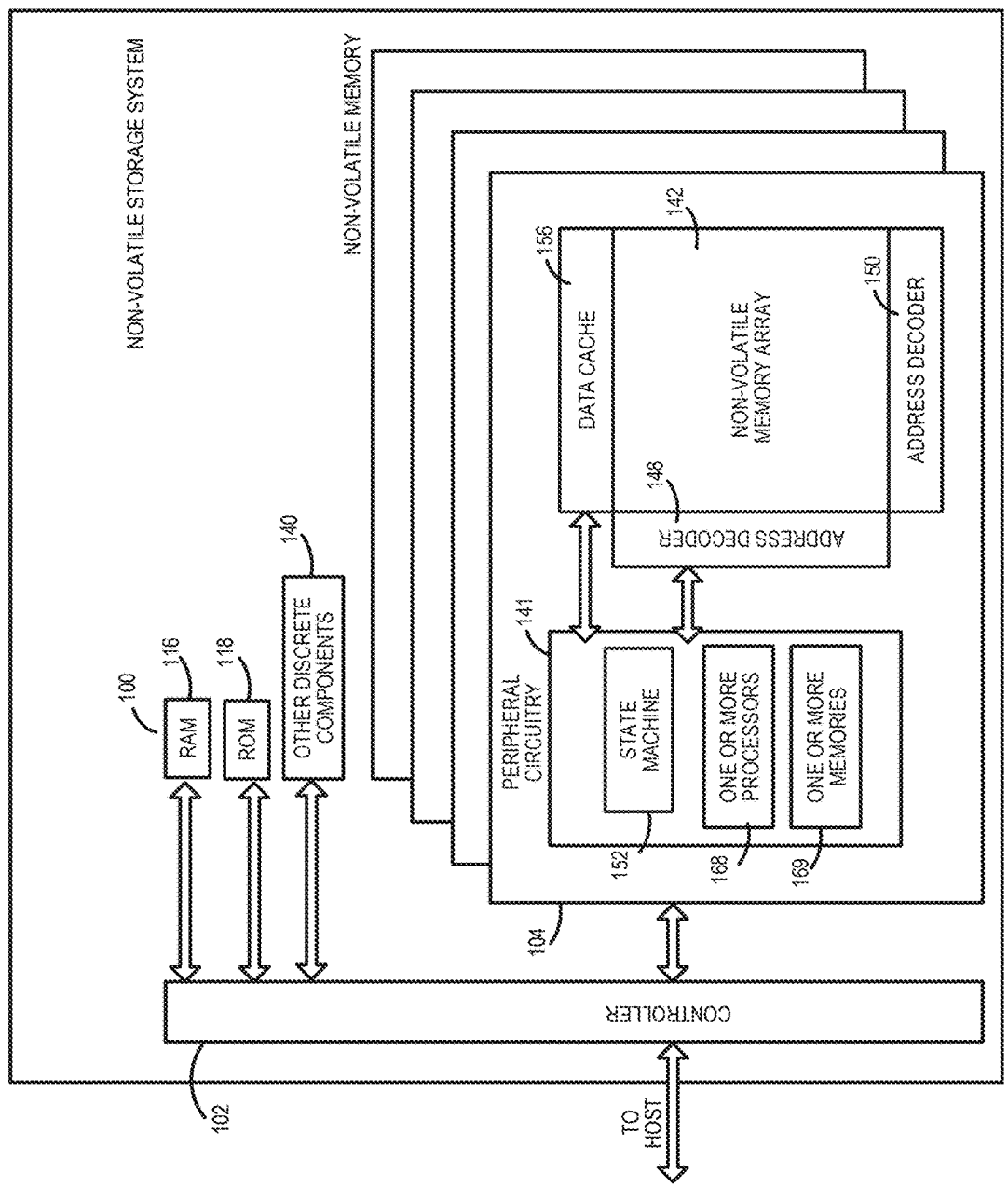
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
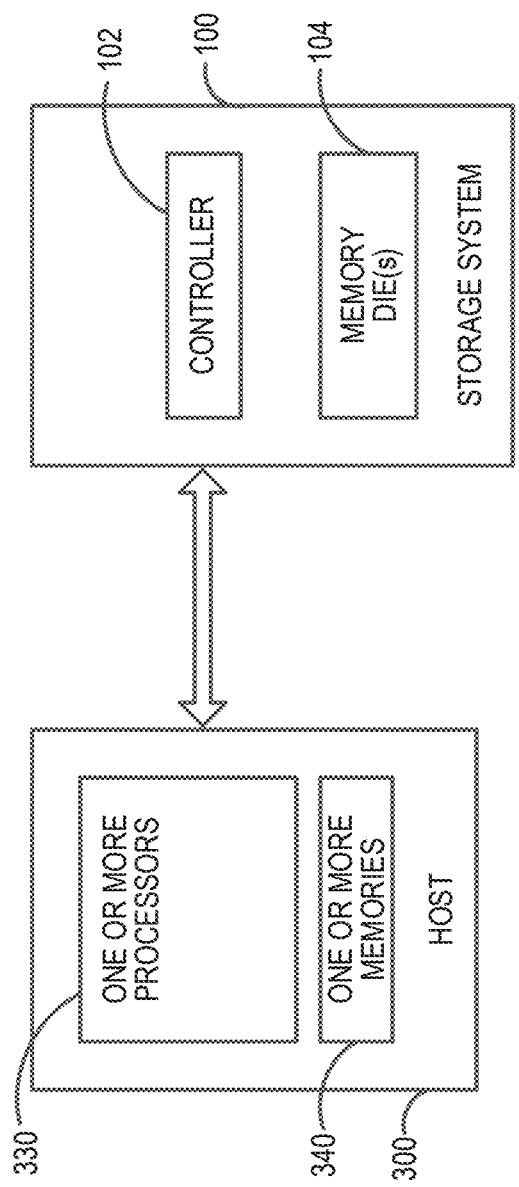
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
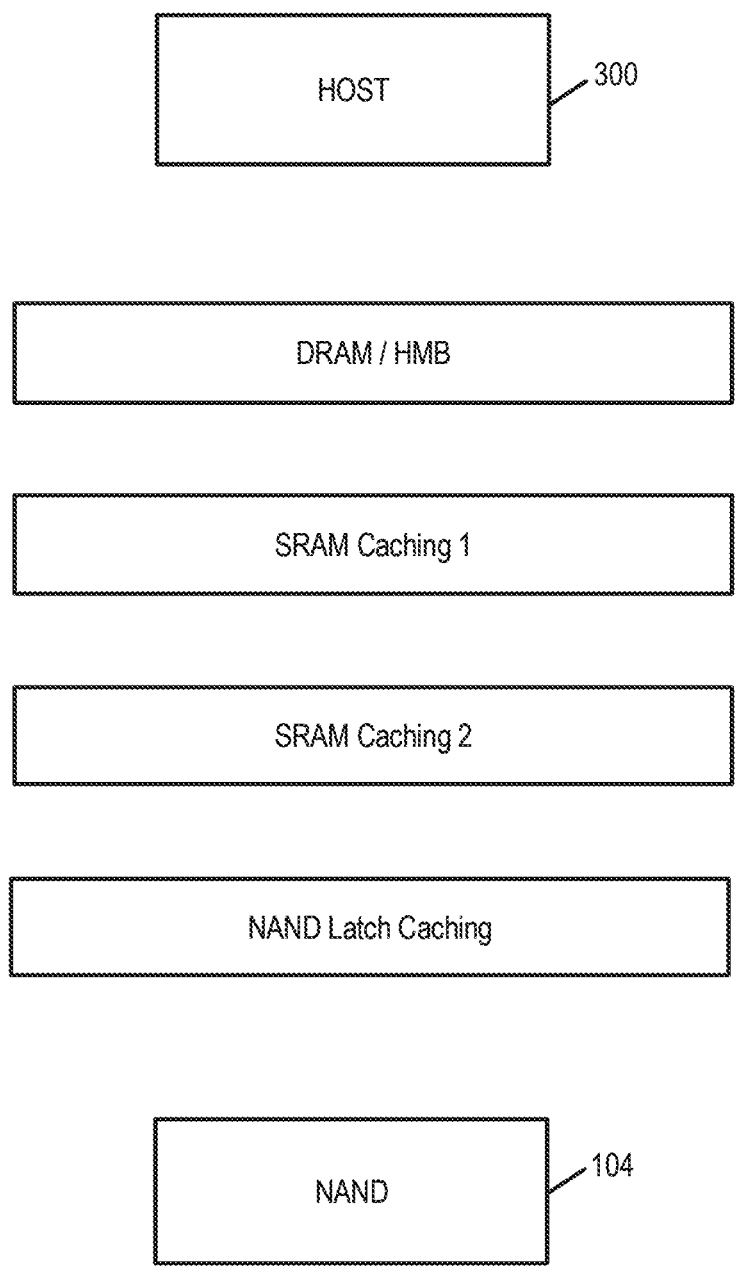
FIG. 4 is an illustration of a caching architecture of an embodiment.

One or more caches can be maintained in the data storage device 100 to accelerate various commands (e.g., read commands). FIG. 4 is an example of a caching architecture having four caching levels between the host 300 and the non-volatile memory 104. As shown in FIG. 4, in this example, the caching levels are DRAM/HMB (host memory buffer), SRAM Caching 1, SRAM Caching 2, and NAND latch caching. A host memory buffer is volatile memory in the host 300 that is allocated for exclusive use by the data storage device's controller 102. Data in the host memory buffer is not modified or accessed proactively by the host 300 (i.e., data is guaranteed to be valid), and the host 300 is obligated to notify the data storage device's controller 102 before any operation that might lead to data loss (e.g., in case of power loss or in case the host 300 might need the buffer) (in such cases, the host 300 lets the controller 102 acknowledge the operation before the data is lost). An HMB descriptor list on the host 300 can maintain a listing of entries associated with host data buffers for exclusive use by the controller 102. During initialization, the host software may provide the HMB descriptor list to the data storage device 100 for exclusive use by the controller 102.

In some prior data storage devices, most of the cache utilization is without specific intelligence related to host behavior and is mostly based on cache size or if the cache is relatively fast to slow, where a faster cache is typically preferred. That is, caching is mostly in a fixed order based on the cache size (whichever cache is free is used) and speed (a faster cache is typically preferred). However, this may not provide optimal performance. The following embodiments address this problem by defining cache layering based on the various parameters to determine which command to bring to which cache layer for optimal performance. The cache layering can be done dynamically, and the attributes can be exposed to the host 300, so that a given command arrives with an indication. Alternatively, the controller 102 of the data storage device 100 can perform a fetch based on an estimated fetch time to the proper cache layer to optimally use the cache.

In general, these embodiments define cache layer dynamic priority and utilize the cache per command using attributes/parameters. The parameters can include, but are not limited to, cache release time, cache arrival time, cache release rate, cache arbitration policy, and cache eviction ratio. Cache release start time depends on the cache's distance from the host 300. Cache ready arrival time depends on the cache's distance from the non-volatile memory 104. Cache release rate depends on how fast the cache can release the data. Cache arbitration policy depends on the multiple cache queues and how the various requests can be interleaved. Cache eviction ratio depends on the commands to be evicted versus incoming commands at any given point. These embodiments can dynamically utilize the command finish time using the above attributes to determine which cache should be used for a given command. The controller 102 of the data storage device 100 can expose the cache attributes to the host 300 for an indication to the cache. Without a host indication, the controller 102 of the data storage device 100 can determine the estimated fetch time for a given command and use the appropriate cache layer.

Figure 5:
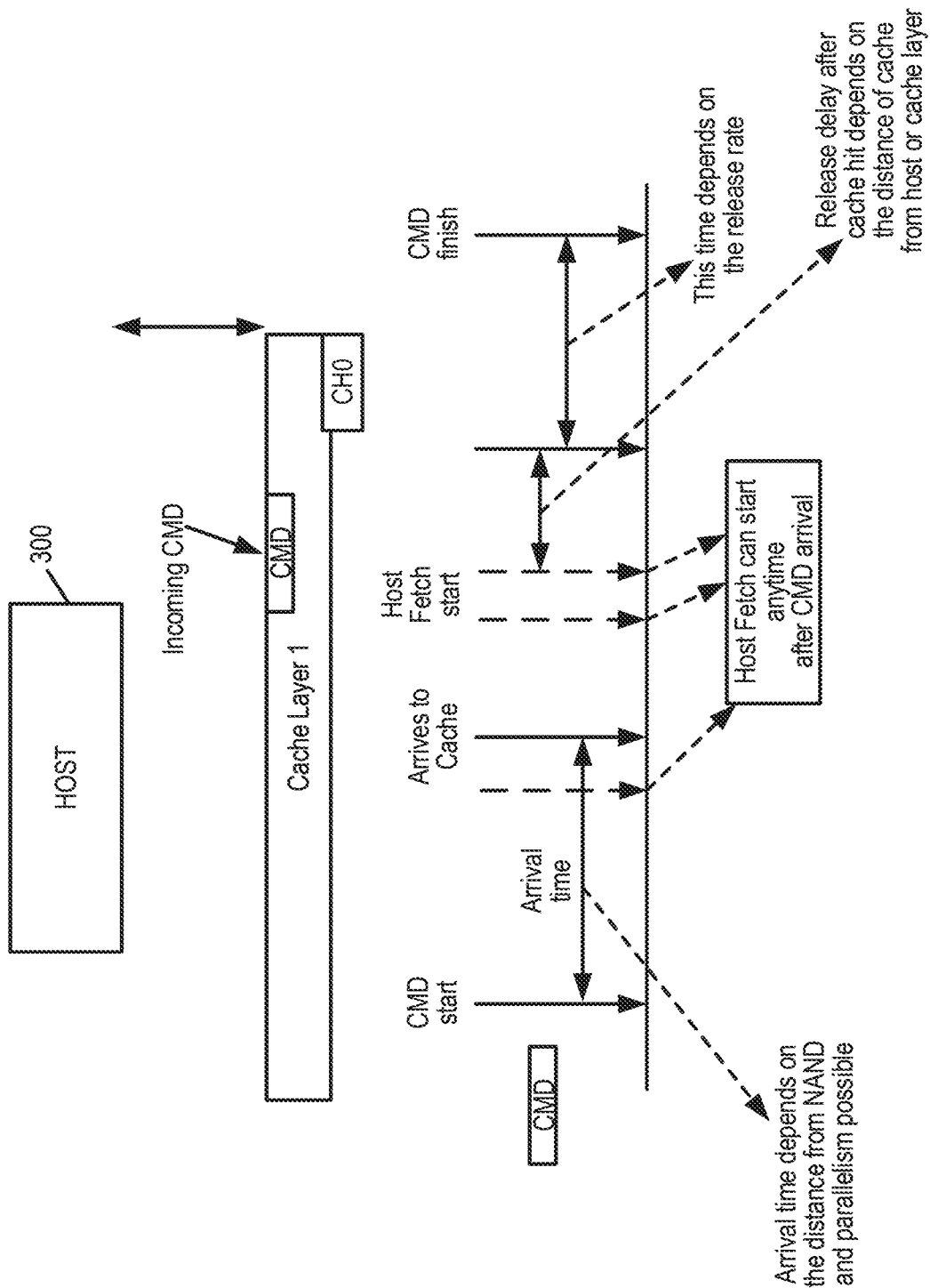
FIG. 5 is an illustration of an embodiment in which cache layer attributes are defined to dynamically change a command to a single cache layer.

Turning again to the drawings, FIG. 5 is an illustration of an embodiment in which cache layer attributes are defined to dynamically change a command to a cache layer. As shown in FIG. 5, the arrival time of a command to the cache depends on the distance from the memory 104 and possibly parallelism. The host fetch can start any time after the command's arrive in the cache. The release delay after a cache hit depends on the distance of the cache from the host 300 or cache layer. This is different from a fixed priority for every cache, as the priority of the cache layer is calculated dynamically for each command used the various attributes mentioned above.

Figure 6:
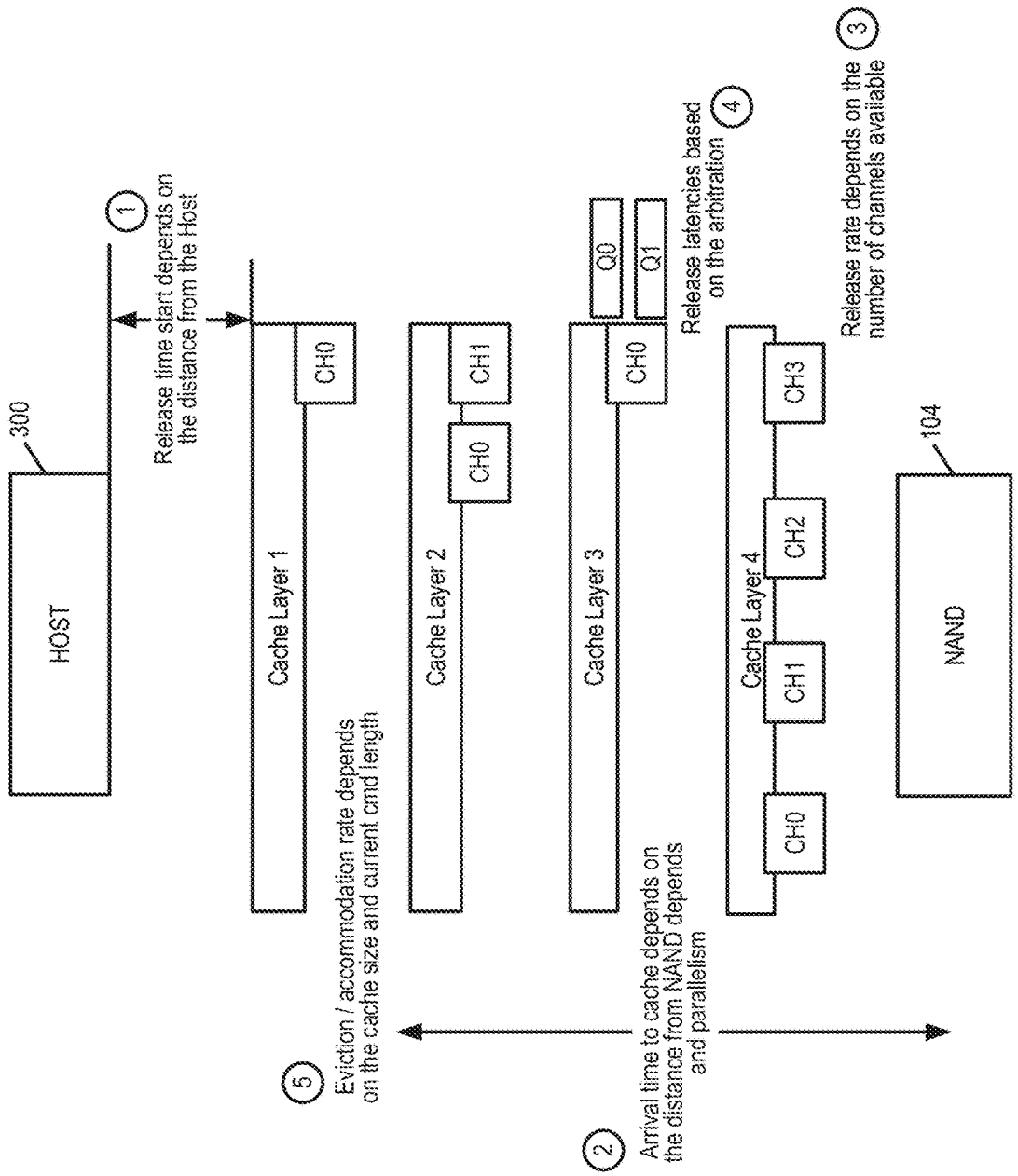
FIG. 6 is an illustration of an embodiment in which cache layer attributes are defined to dynamically change a command to multiple cache layers.

FIG. 6 shows an embodiment with multiple cache layers. As shown in FIG. 6, the release time from Cache Layer 1 depends on the distance between Cache Layer 1 to the host 300. The arrival time to Cache Layer 2 depends on the distance between Cache Layer 2 and the memory 104 and on parallelism. The release rate from Cache Layer 4 depends on the number of channels available. The release latency between Cache Layers 3 and 4 is based on arbitration. The eviction/accommodation rate depends on the cache size and the current command length. So, various factors define the cache layering to be utilized by the host 300, including distance from the host 300 (ack/release time start after cache hit to release the first data), arrival time (which depends on the distance to the memory 104), release rate based on the channel available and the queues/arbitration and channel/arbitration interleaving, and size of the cache and estimated eviction/accommodation rate for the current command.

The following example shows how the host fetch time changes the dynamic priority of the cache layers, as well as a dependence on host fetching. Without this embodiment, Cache Layer 1 may always be preferred, but the following example shows that for CMD1, Cache Layer 4 works better and, for CMD2, Cache Layer 1 works better. For CMD1, the host fetch time is 20 microseconds. If Cache 1 is used, the performance is not optimal, as the cache ready time is higher, and the release time is slower. Instead, if Cache Layer 4 is used, cache ready is faster, and the release rate is faster. Hence, Cache Layer 4 performs better. The situation changes for CMD2, where fetch time is higher than any of the cache arrival or ready times, and Cache 1 performs better.

More specifically, in this example for Cache Layer 1, the release start time is 2 microseconds, the arrival time is 30 microseconds after the command is received by the data storage device 100, and the release rate using channel one (CH1) is about one gigabyte per second. Also in this example for Cache Layer 4, the release start time is 10 microseconds, the arrival time is 20 microseconds after the command is received by the data storage device 100, the release rate using channel one (CH1) is about one gigabyte per second, the release rate using all four channels is about four gigabyte per second, and the cache interleave is four kilobytes (4 KB). Also, a 4 KB command is used, and cache selection is based on host fetch time and release/arrival time variation.

For command 1 (CMD1), at incoming time 0, the estimated fetch time is 20 microseconds. Since the host 300 consumes the command after 20 microseconds before the arrival time to Cache Layer 1, the start time will be 30 microseconds plus the release delay of two microseconds plus the release rate of 1 GB/second which gives four microseconds. The total time is about 36 microseconds if the data is fetched to Cache Layer 1. However, since the host 300 consumes the command after 20 microseconds, about the same time to arrive to Cache Layer 4, the start time will be 20 microseconds plus the release delay of 10 microseconds plus the release rate of 1 GB/second which gives four microseconds. The total time is about 34 microseconds if the data is fetched to Cache Layer 4. So, the Cache Layer 1 timing of 36 microseconds is greater than the Cache Layer 4 timing of 34 microseconds. Thus, Cache Layer 1 is preferred over Cache Layer 4.

For command 2 (CMD2), at incoming time 0, the estimated fetch time is 40 microseconds. Since the host 300 consumes the command after 40 microseconds before the arrival time to Cache Layer 1, the start time will be 40 microseconds plus the release delay of two microseconds plus the release rate of 1 GB/second which gives four microseconds. The total time is about 46 microseconds if the data is fetched to Cache Layer 1. However, since the host 300 consumes the command after 40 microseconds, about the same time to arrive to Cache Layer 1, the start time will be 40 microseconds plus the release delay of 10 microseconds plus the release rate of 1 GB/second which gives four microseconds. The total time is about 54 microseconds if the data is fetched to Cache Layer 4. So, the Cache Layer 1 timing of 46 microseconds is greater less the Cache Layer 4 timing of 54 microseconds. Thus, Cache Layer 4 is preferred over Cache Layer 1.

Similarly, the following example shows how release rate and command length impact the dynamic priority of the cache layers. Without this embodiment, Cache Layer 1 is preferred as it is top-most layer. However, the following example shows that for CMD1, Cache Layer 4 works better, and, for CMD2, Cache Layer 1 works better. For CMD1, the host fetch time is irrelevant for this example, as it is higher than the cache ready time for both Cache Layers 1 and 4. For CMD1, even if Cache Layer 1 can start releasing the command early, the release rate is slower, and the command finish time will be higher. If Cache Layer 1 is used, the performance is not optimal where the host 300 is bottlenecked. However, if Cache Layer 4 is used, the cache release time is faster, and even if the command release start time is slightly later, the overall command finish time is higher. Hence, Cache Layer 4 performs better in these workloads where the queue depth (QD) is limited. The situation changes for CMD2 where the command length is shorter, and the command release start takes precedence over the release rate. Here Cache Layer 1 performs better.

More specifically, for CMD1, at incoming time 0, the estimated fetch time is 100 microseconds. Since the host 300 consumes the command after 100 microseconds before the arrival time to Cache Layer 1, the start time will be 100 microseconds plus the release delay of two microseconds plus the release rate of 1 GB/second which gives 128 microseconds. The total time is about 230 microseconds if the data is fetched to Cache Layer 1. However, since the host 300 consumes the command after 100 microseconds, about the same time as arrival to Cache Layer 4, the start time will be 100 microseconds plus the release delay of 10 microseconds plus the release rate of 4 GB/second which gives 32 ur onds. The total time is about 142 microseconds if the data is fetched to Cache Layer 4. So, the Cache Layer 1 timing of 230 microseconds is greater than the Cache Layer 4 timing of 142 microseconds. Thus, Cache Layer 1 is preferred over Cache Layer 4.

For command 2 (CMD2), at incoming time 0, the estimated fetch time is 100 microseconds. Since the host 300 consumes the command after 100 microseconds before the arrival time to Cache Layer 1, the start time will be 40 microseconds plus the release delay of two microseconds plus the release rate of 1 GB/second which gives 16 microseconds. The total time is about 118 microseconds if the data is fetched to Cache Layer 1. However, since the host 300 consumes the command after 40 microseconds, about the same time as arrival to Cache Layer 1, the start time will be 100 microseconds plus the release delay of 10 microseconds plus the release rate of 1 GB/second which gives 16 microseconds. The total time is about 126 microseconds if the data is fetched to Cache Layer 4. So, the Cache Layer 1 timing of 116 microseconds is greater less the Cache Layer 4 timing of 126 microseconds. Thus, Cache Layer 4 is preferred over Cache Layer 1.

Figure 7:
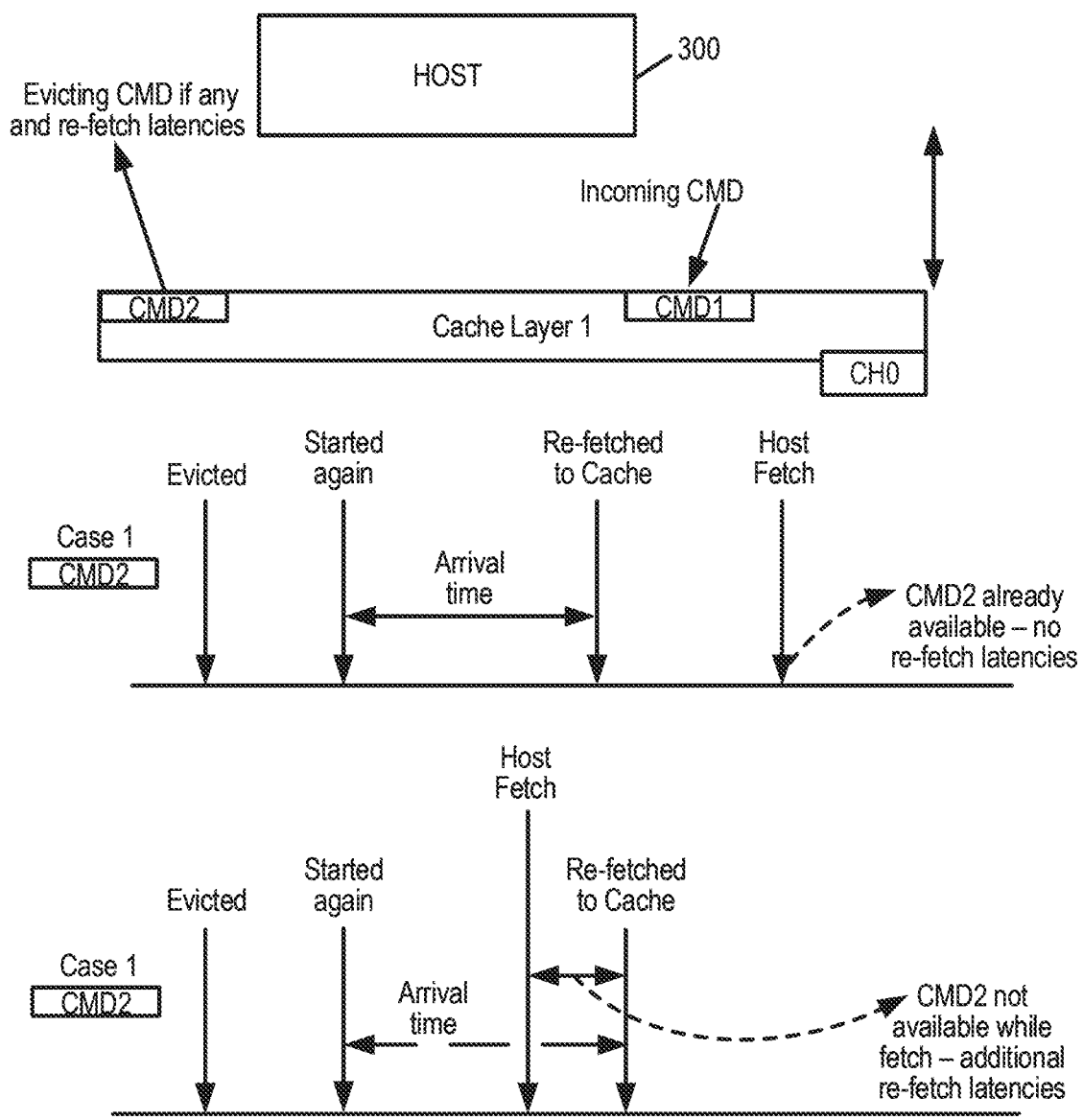
FIG. 7 is an illustration of an embodiment in which an eviction ratio changes a dynamic priority of cache layers.
Figure 8:
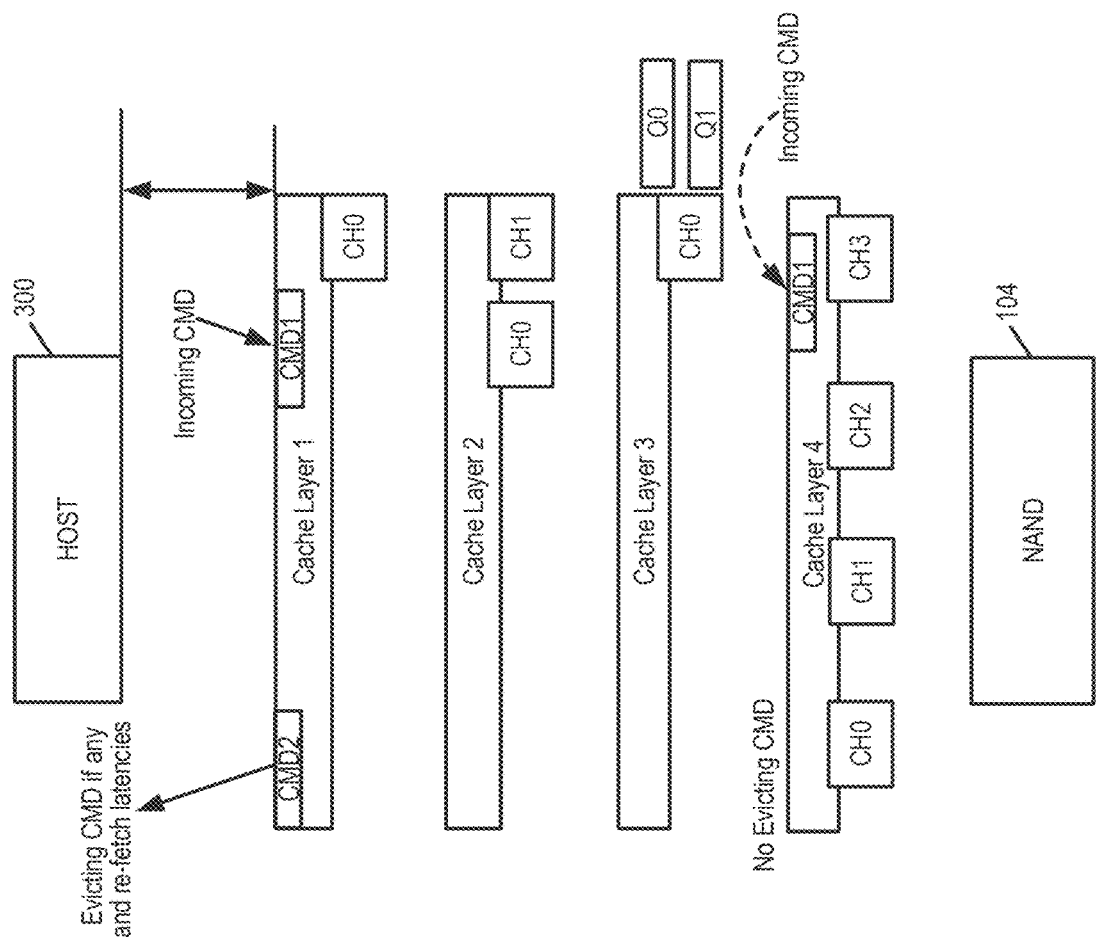
FIG. 8 is an illustration of an embodiment in which cache layer attributes are defined to dynamically change a command to multiple cache layers.

Turning again to the drawings, FIG. 7 illustrates an embodiment in which the eviction ratio changes the dynamic priority of the cache layers. Once the cached command is evicted and has to be re-fetched, the re-fetch latency is measured as shown in the drawings. There may not be any penalty, or there could be additional re-fetch latency depending the fetch time. Without this embodiment, Cache Layer 1 is preferred. However, as the below example (illustrated in FIG. 8) shows, for Case 1, Cache Layer 1 works better, and, for Case 2, Cache Layer 4 works better. Here, if any previous command is getting evicted, re-fetch latencies are added. Here, the re-fetch latencies can be zero as well, but the caching priority is decided dynamically even if there is eviction from all cache layers.

More specifically, for CMD1, at incoming time 0, the estimated fetch time is 40 microseconds. Since the host 300 consumes the command after 40 microseconds before the arrival time to Cache Layer 1, the start time will be 40 microseconds plus the release delay of two microseconds plus the release rate of 1 GB/second which gives 4 microseconds. The total time is about 40 microseconds if the data is fetched to Cache Layer 1. However, since the host 300 consumes the command after 40 microseconds, about the same time as arrival to Cache Layer 4, the start time will be 40 microseconds plus the release delay of 10 microseconds plus the release rate of 4 GB/second which gives 4 microseconds. The total time is about 54 microseconds if the data is fetched to Cache Layer 4. So, the Cache Layer 1 timing of 46 microseconds is greater than the Cache Layer 4 timing of 54 microseconds. Thus, Cache Layer 1 is preferred over Cache Layer 4.

For command 2 (CMD2), at incoming time 0, the estimated fetch time is 40 microseconds. Since the host 300 consumes the command after 40 microseconds before the arrival time to Cache Layer 1, the start time will be 40 microseconds plus the release delay of two microseconds plus the release rate of 1 GB/second which gives 4 microseconds. The total time is about 61 microseconds if the data is fetched to Cache Layer 1. However, since the host 300 consumes the command after 40 microseconds, about the same time as arrival to Cache Layer 1, the start time will be 40 microseconds plus the release delay of 10 microseconds plus the release rate of 1 GB/second which gives 4 microseconds. The total time is about 54 microseconds if the data is fetched to Cache Layer 4. So, the Cache Layer 1 timing of 61 microseconds is less the Cache Layer 4 timing of 54 microseconds. Thus, Cache Layer 1 is preferred over Cache Layer 4.

Figure 9:
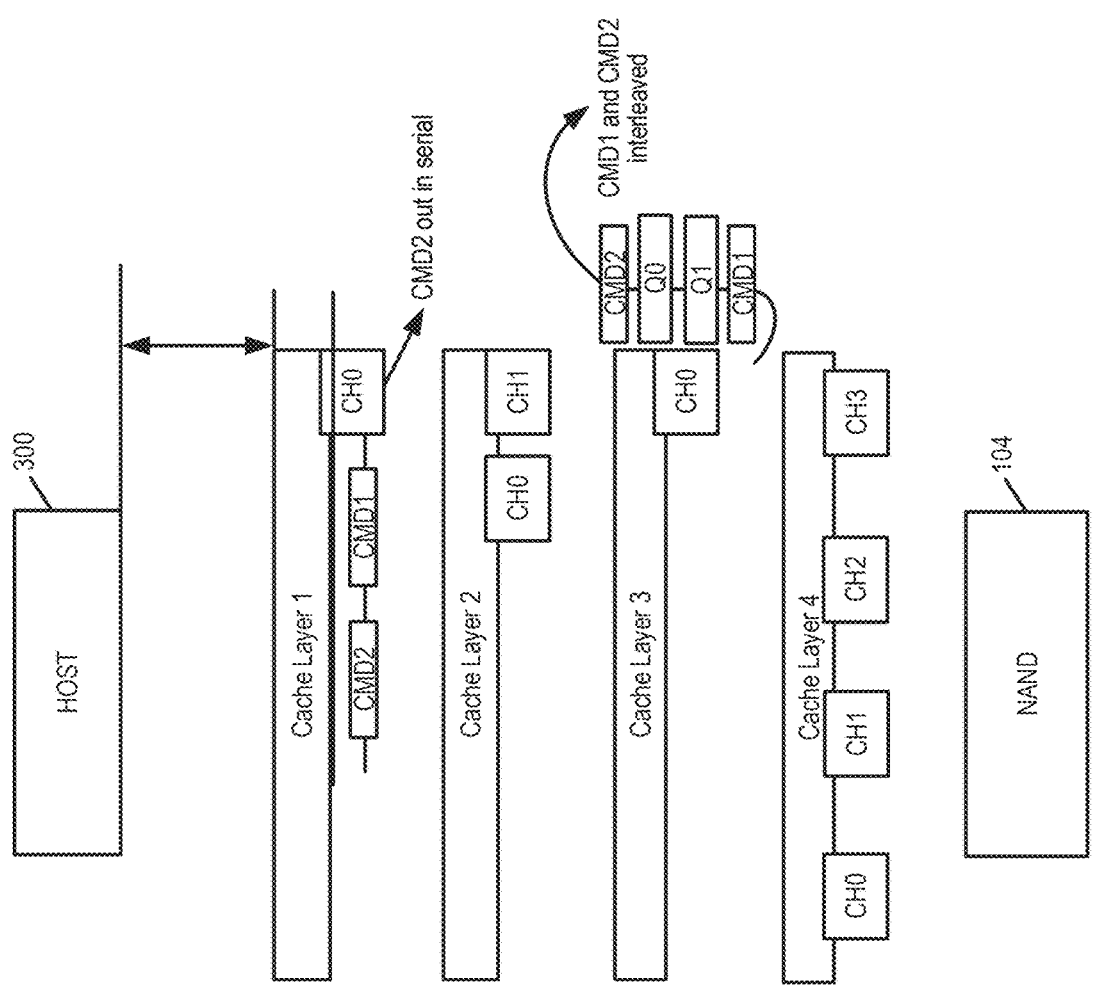
FIG. 9 is an illustration of an embodiment in which release start time can change a priority of a cache.

FIG. 9 illustrates how the release start time can change the priority of the cache when latencies of the start is more important than the actual finish time. In this example, Case 1 gives a higher release start time to CMD2, and Case 2 using Cache Layer 3 gives a lower release time to CMD2. More specifically, in this example for Cache Layer 1, the release start time is 2 microseconds, the arrival time is 30 microseconds after the command is received by the data storage device 100, and the release rate using channel one (CH1) is about one gigabyte per second. Also, for Cache Layer 4, the release start time is 10 microseconds, the arrival time is 20 microseconds after the command is received by the data storage device 100, the release rate using channel one (CH1) is about one gigabyte per second, the release rate using all four channels is about four gigabyte per second, the command is 16 KB, and the cache interleave is 4 KB or 16 KB.

In Case 1, the estimated fetch time is 40 microseconds. Since the host 300 consumes the command after 40 microseconds before the arrival time to Cache Layer 1, the start time will be 40 microseconds plus the release delay of two microseconds plus the release rate of 1 GB/second which gives 16 microseconds. The total time is about 58 microseconds, and CMD2 will start at about 66 microseconds if data is fetched to Cache Layer 1. In Case 2, the estimated fetch time is 40 microseconds. Since the host 300 consumes the command after 40 microseconds before the arrival time to Cache Layer 1, the CMD1 start time will be 40 microseconds plus the release delay of two microseconds which gives 42 microseconds if data is fetched to Cache 3. So, CMD2 start time using Cache Layer 1 is 66 microseconds, which is greater than a start time of 42 microseconds using Cache Layer 3. Thus, the cache preference is to fetch CMD2 from Cache Layer 3.

Also, regarding host-device communication, the data storage device 100 can maintain cache attributes and releases to the host 300 when asked. Also, the host 300 can utilize this for better cache performance by sending the indication to which cache the command needs to be brought to. In another embodiment, in absence of host indication, the data storage device 100 uses the available attributes, and, based on that, the estimated fetch time is taken to determine the dynamic priority, and the same decisions are taken.

There are several advantages associated with the embodiments. For example, by using the dynamic priority for the cache layers per command based on the above-mentioned cache attributes and methodology, efficient command completion/command latencies can be achieved for optimal cache performance. These embodiments can be used in environments where various cache layers can be available.

Figure 10:
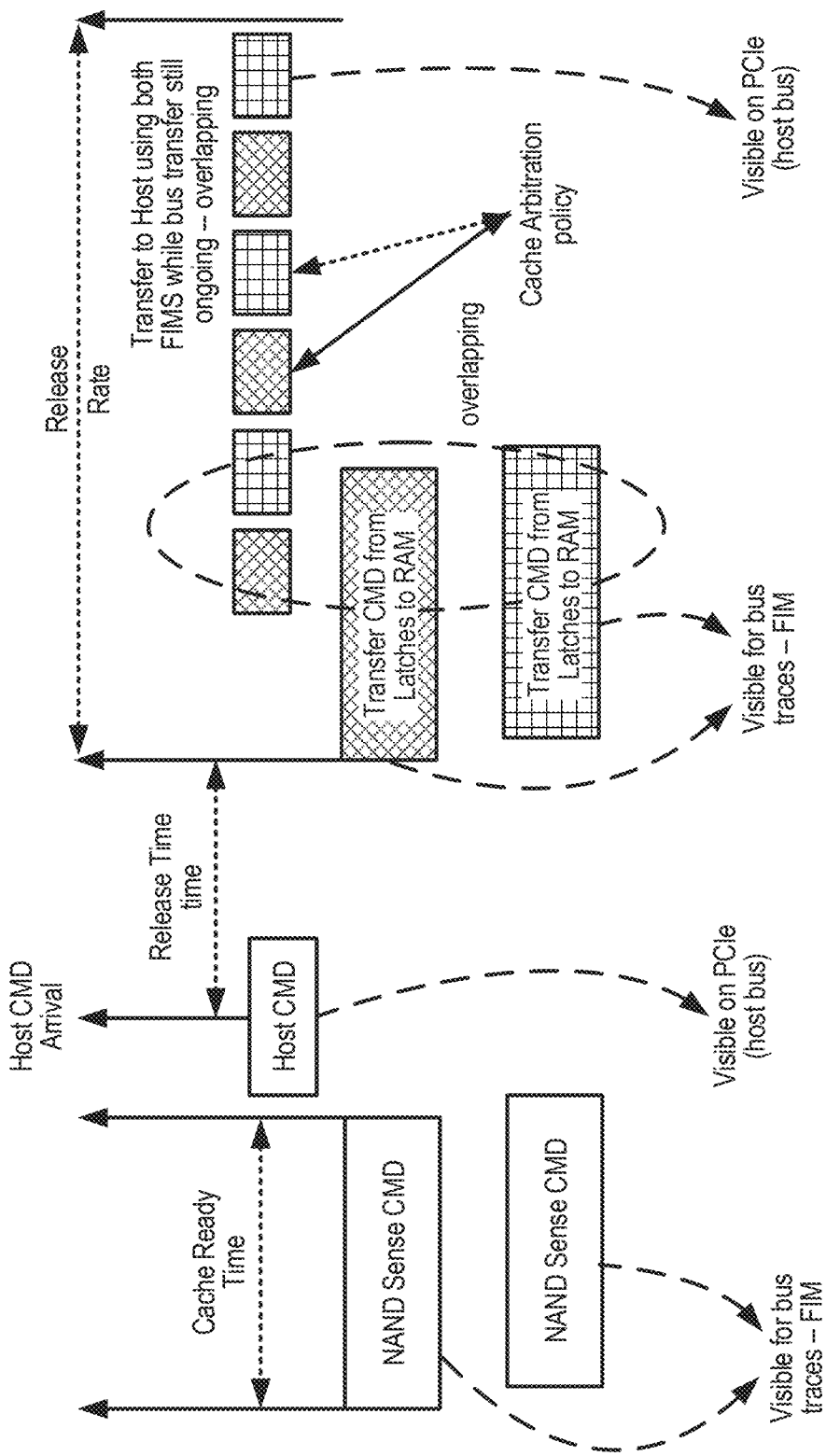
FIGS. 10-13 are illustrations of cache layers of an embodiment.

In summary, some of the above embodiments define the cache layer dynamic priority and utilize the cache per command using various following attributes. The various cache layers can be defined (e.g., Cache Layer 1 DRAM/HMB; Cache Layer 2 SRAM type 1 using one queued interface, Cache Layer 2 SRAM type 2 using interleaved release; Cache Layer 4 NAND latch caching). FIG. 10 illustrates Cache Layer 4—NAND latch caching. This is the deepest layer of cache where the bus only contains sense command (on the flash interface module (FIM)), and transfer commands on the FIM are seen once the host commands arrive. The data is directly transferred to the host using multiple FIMs. The usage of multiple FIMs and the command transfer initiation after receiving the commands can analyzed to determine that the deepest cache is being used. Cache arbitration policy uses all the channels in interleaved fashion.

Figure 11:
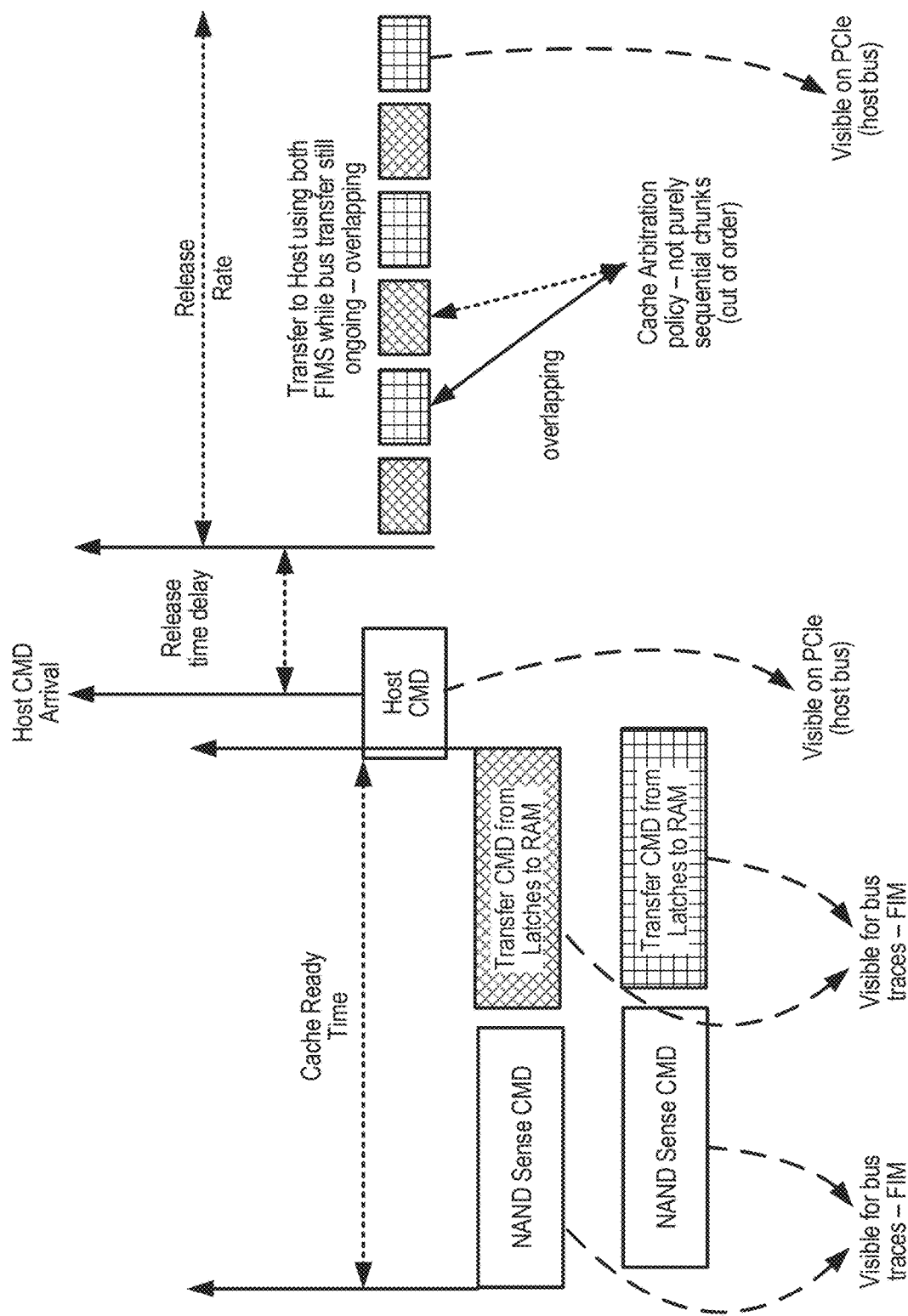

FIG. 11 is an illustration of cache layer—SRAM type 2 using interleaved commands. In this example, the cache will be determined when transfer commands are seen before the host command is received. The fetching and data transfer to the host happens after receiving the actual command, and the command is released in an interleaved fashion from multiple channels as shown in the cache arbitration policy.

Figure 12:
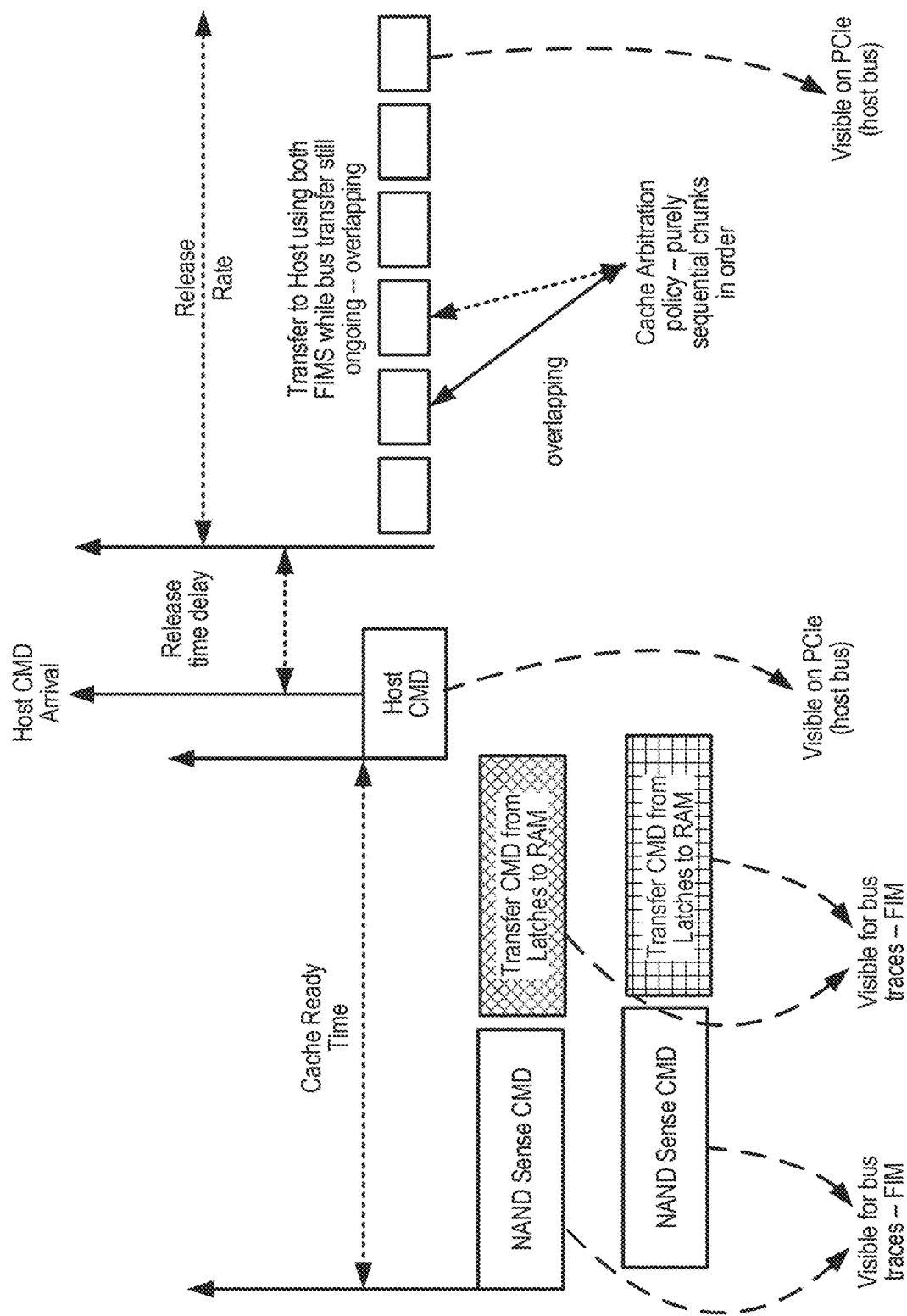
Figure 13:
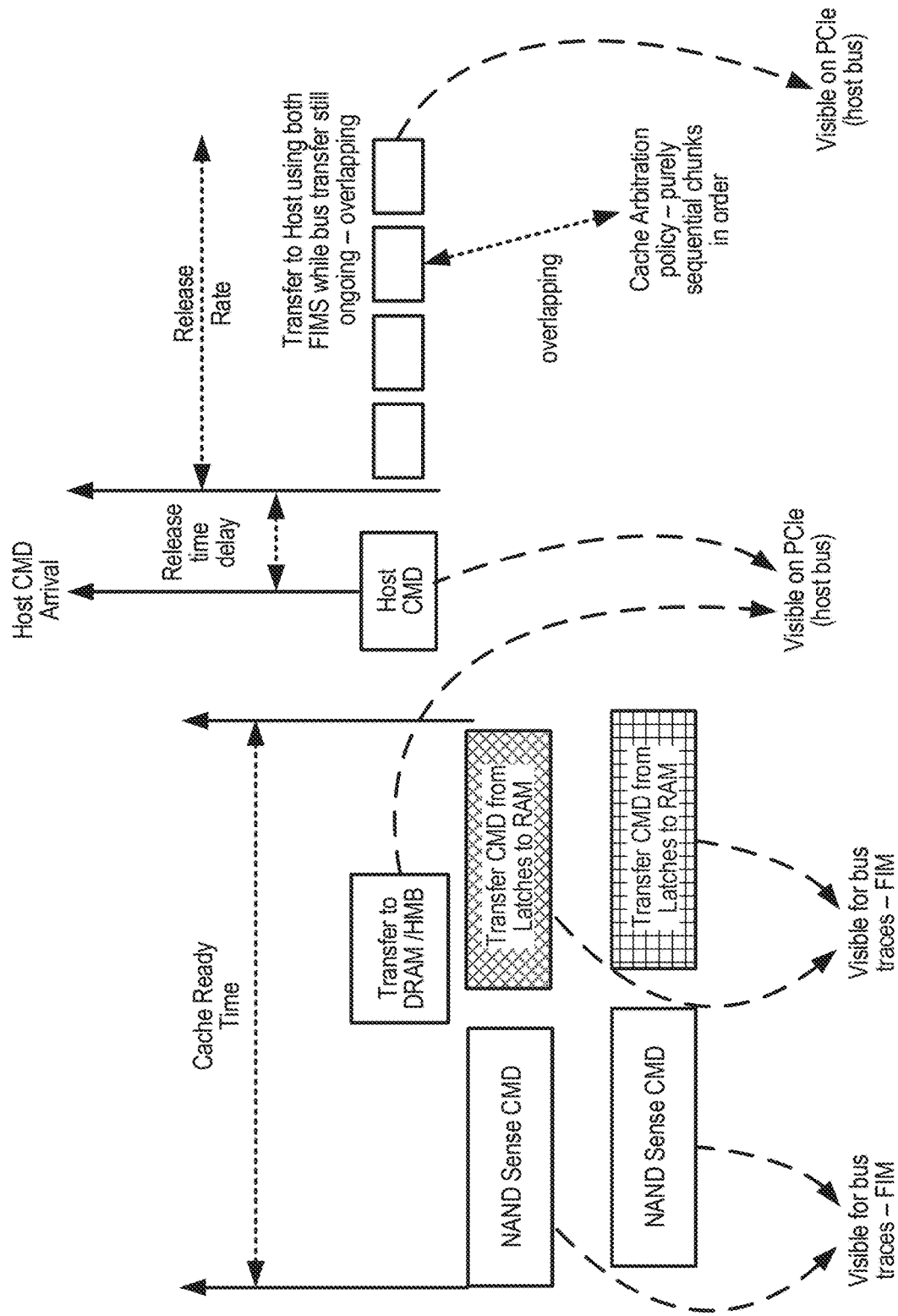

FIG. 12 is an illustration of cache layer—SRAM type 1. In this example, the cache will be determined when the transfer commands are seen, but the fetching and data transfer to the host happens after receiving the actual command. The command is released in an ordered fashion from single channels. FIG. 13 is an illustration of cache layer 1 (DRAM.HMB). In this example, this cache is closest to the HIM driver. All the activities related to the NAND sense and FIM transfer command are seen, and additional caching to DRAM/HMB is also directly done to accommodate large cache commands. The fetching and data transfer to the host happens after receiving the actual command, and the command is released in an ordered fashion using the DRAM/HMB interface, whose release rate can be slower than the multiple channels involved, but the latency of release is lower.

Once the destination cache is determined, various attributes can easily be identified by using the same examples mentioned above. The cache layer can keep varying. The cache utilization can be checked based on the release from the various channels using parallelism and the NAND trace activity (latch caching will have specific sequences), and the HMB/DRAM can be directly available using bus the interface. There can be clear differentiation between these attributes.

Figure 14:
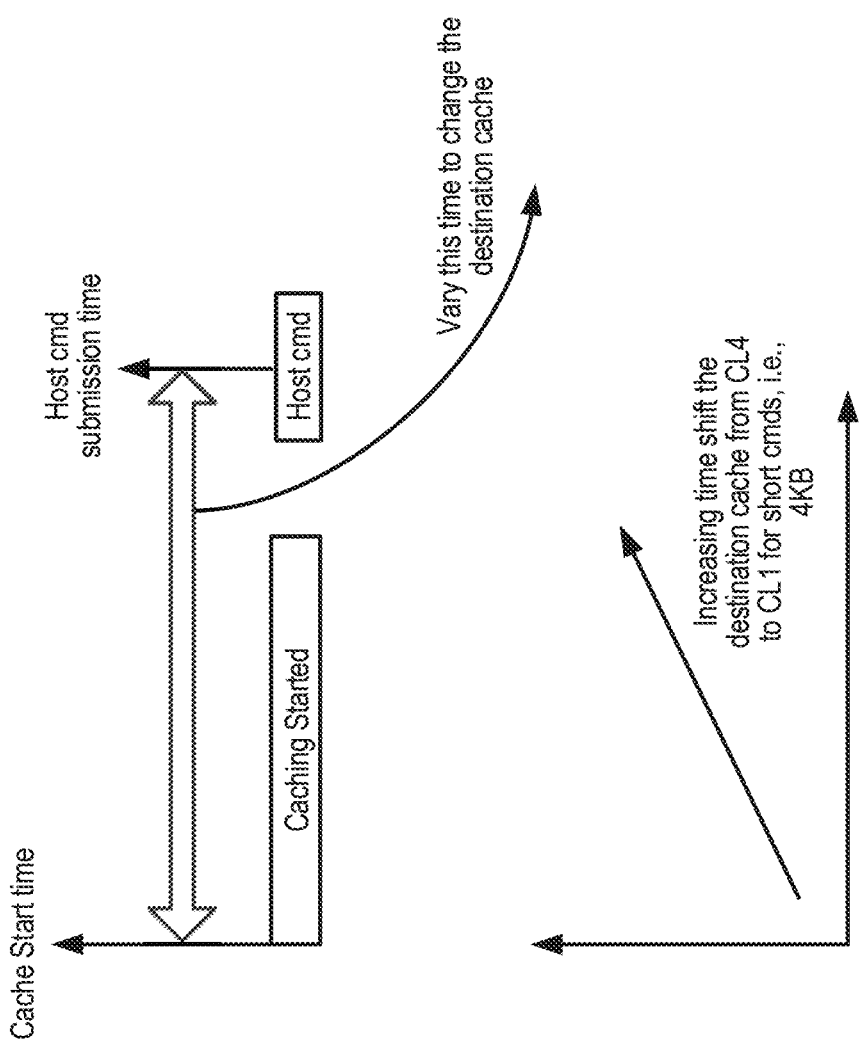
FIG. 14 are graphs of an embodiment relating to cache release start time.

FIG. 14 are graphs relating to cache release start time. As shown in FIG. 14, cache release start time can be checked after host command arrival and the data transfer start difference. The cache ready arrival time depends on the distance from the NAND. The cache release rate depends on how fast the cache can release the data and depends on the channels used and the interface. The cache arbitration policy depends on the multiple queues at cache and how the various requests can be interleaved. The cache eviction ratio depends on the commands to be evicted versus incoming commands at any given point. This generally remains fixed and depends on the cache size. For a DRAM/HMB cache, the eviction ratio is low. For an SRAM cache, the eviction ratio is high. For NAND latch caching, the eviction ratio is in the middle.

Host traffic or simple commands can be used to identify dynamically utilizing the command finish time with attributes. For example, for 4 KB commands can be cached as per sequential workload. After caching, the host commands submission time can be varied (delay from cache start to host submission). If the cache start to submission time is lower, Cache Layer 4 using NAND latches is used. With increasing time, Cache Layer using DRAM/HMB can be used. Also, when the command length size is 1 MB or higher, a highest release rate can be used even if the higher time is provided to the host submission command. While using very large commands, only the DRAM/HMB can accommodate such type of commands. If the release rate is lower but enough host submission time is provided, the DRAM/HMB can be used; otherwise, Cache Layer 4 using latches can be used.

Also, the data storage device 100 can expose cache attributes to the host 300 for an indication to the cache. This can be done by a handshake between the host 300 and the data storage device 100, and specific attributes can be shared in advance, so that the host 100 can take some decision if needed in advance. This can be seen on the bus where host-device communication exposes these parameters in advance, and the host 300 predetermines the estimated command completion time using each cache and sends the indication to the data storage device 100 to use a particular cache. Without the host indication, the data storage device 100 can determine the estimated fetch time for the given command and use the appropriate cache layer. In the absence of an indication from the host 300, the data storage device 100 can dynamically calculate the finish time and the foreground/background time and decide the final destination or which cache to use. The same host traffic can again be used to determine the destination cache part. In absence of the host indication, the data storage device 100 can determine the estimated completion time using each cache and choose the best one by using the above attributes.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a non-volatile memory;
   a plurality of caches; and
   one or more processors, individually or in combination, configured to:
     dynamically define priority for each cache in the plurality of caches based on attributes of each cache, wherein the attributes comprise cache release time, cache arrival time, cache release rate, cache arbitration policy, and cache eviction ratio;
     expose the attributes of each cache to a host;
     receive, from the host, (i) a command to read data from the non-volatile memory and (ii) a selection of a cache from the plurality of caches to use for the command, wherein the selection is based on the attributes of each cache in the plurality of caches and an estimated finish time for the command but not on a speed of each cache;
     read the data from the non-volatile memory; and
     store the data in the selected cache.

2. The data storage device of claim 1, wherein the plurality of caches comprises four caches.

3. The data storage device of claim 1, wherein the plurality of caches comprises a static random-access memory.

4. The data storage device of claim 1, wherein the plurality of caches comprises a dynamic random-access memory.

5. The data storage device of claim 1, wherein the plurality of caches comprises a data latch in the non-volatile memory.

6. The data storage device of claim 1, wherein the non-volatile memory comprises a three-dimensional memory.

7. A method comprising:
   performing in a data storage device comprising a non-volatile memory and a plurality of caches:
   dynamically defining priority for each cache in the plurality of caches based on attributes of each cache, wherein the attributes comprise cache release time, cache arrival time, cache release rate, cache arbitration policy, and cache eviction ratio;
   exposing the attributes of each cache to a host;
   receiving, from the host, (i) a command to read data from the non-volatile memory and (ii) a selection of a cache from the plurality of caches to use for the command, wherein the selection is based on the attributes of each cache in the plurality of caches and an estimated finish time for the command but not on a speed of each cache;
   reading the data from the non-volatile memory; and
   storing the data in the selected cache.

8. The method of claim 7, wherein the plurality of caches comprises a host memory buffer.

9. The method of claim 7, wherein the non-volatile memory comprises a three-dimensional memory.

10. A data storage device comprising:
    a non-volatile memory;
    a plurality of caches; and
    means for;
    dynamically defining priority for each cache in the plurality of caches based on attributes of each cache, wherein the attributes comprise cache release time, cache arrival time, cache release rate, cache arbitration policy, and cache eviction ratio;
    exposing the attributes of each cache to a host;
    receiving, from the host, (i) a command to read data from the non-volatile memory and (ii) a selection of a cache from the plurality of caches to use for the command, wherein the selection is based on the attributes of each cache in the plurality of caches and an estimated finish time for the command but not on a speed of each cache;
    reading the data from the non-volatile memory; and
    storing the data in the selected cache.

11. The data storage device of claim 1, wherein the plurality of caches comprises a host memory buffer.

12. The method of claim 7, wherein the plurality of caches comprises four caches.

13. The method of claim 7, wherein the plurality of caches comprises a static random-access memory.

14. The method of claim 7, wherein the plurality of caches comprises a dynamic random-access memory.

15. The method of claim 7, wherein the plurality of caches comprises a data latch in the non-volatile memory.

* * * * *